(12) United States Patent
Sadakata et al.

(10) Patent No.: US 9,964,107 B2
(45) Date of Patent: May 8, 2018

(54) FLUID MACHINE

(71) Applicant: Hitachi Industrial Equipment Systems Co., Ltd., Chiyoda-ku, Tokyo (JP)

(72) Inventors: Kosuke Sadakata, Tokyo (JP); Koichi Tashiro, Tokyo (JP); Kazutaka Suefuji, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 251 days.

(21) Appl. No.: 14/761,696

(22) PCT Filed: Jun. 24, 2013

(86) PCT No.: PCT/JP2013/067171
§ 371 (c)(1),
(2) Date: Jul. 17, 2015

(87) PCT Pub. No.: WO2014/207791
PCT Pub. Date: Dec. 31, 2014

(65) Prior Publication Data
US 2015/0354551 A1    Dec. 10, 2015

(51) Int. Cl.
*F04B 53/10* (2006.01)
*F04B 39/00* (2006.01)
(Continued)

(52) U.S. Cl.
CPC ...... *F04B 53/1085* (2013.01); *F04B 39/0027* (2013.01); *F04B 39/1066* (2013.01);
(Continued)

(58) Field of Classification Search
CPC . F16K 15/14; F16K 7/17; F16K 15/16; F04B 53/1037; F04B 53/1047;
(Continued)

(56) References Cited

U.S. PATENT DOCUMENTS 5,328,338 A    7/1994  Hirano et al.
5,720,601 A    2/1998  Tark et al.
(Continued)

FOREIGN PATENT DOCUMENTS

CN    1137613 A    12/1996
CN    1202578 A    12/1998
(Continued)

OTHER PUBLICATIONS

KR20020045393 translation, Kim Jong Hyeok, Jun. 2002.*
(Continued)

*Primary Examiner* — Bryan Lettman
(74) *Attorney, Agent, or Firm* — Crowell & Moring LLP

(57) ABSTRACT

A fluid machine includes a piston, a valve seat plate, a valve, and a valve retainer that reduces an opening amount of the valve. One end of the valve retainer is fixed with a fastener together with the valve to the valve seat plate. The fastener spans through the one end of the valve retainer and the valve to thereby fasten the one end of the valve retainer and the valve to the valve seat plate. A second end of the valve retainer that is opposite to the one end does not contact the valve seat plate.

19 Claims, 5 Drawing Sheets

(51) Int. Cl.
*F04B 39/10* (2006.01)
*F16K 15/16* (2006.01)

(52) U.S. Cl.
CPC ...... *F04B 39/1073* (2013.01); *F04B 53/1047* (2013.01); *F16K 15/16* (2013.01); F04B 39/10 (2013.01); F04B 53/104 (2013.01)

(58) Field of Classification Search
CPC .. F04B 53/106; F04B 53/1085; F04B 39/125; F04B 39/1066; F04B 39/1073; F04B 53/104; F04B 39/10
See application file for complete search history.

(56) References Cited

U.S. PATENT DOCUMENTS

| | | | |
|---|---|---|---|
| 5,887,622 | A | 3/1999 | Ahn |
| 5,909,749 | A | 6/1999 | Lee et al. |
| 6,012,489 | A | 1/2000 | Rene et al. |
| 6,820,644 | B1* | 11/2004 | François ............ F04B 39/1073 137/512 |
| 2004/0216791 | A1* | 11/2004 | Inui ....................... F01L 3/205 137/856 |
| 2009/0291007 | A1 | 11/2009 | Yamaoka et al. |

FOREIGN PATENT DOCUMENTS

| | | | |
|---|---|---|---|
| CN | 101321952 A | | 12/2008 |
| JP | 49-13373 | | 4/1974 |
| JP | 60-143181 U | | 9/1985 |
| JP | 61-79896 A | | 4/1986 |
| JP | 61-81073 U | | 5/1986 |
| JP | 7-259739 A | | 10/1995 |
| JP | 10-68382 A | | 3/1998 |
| JP | 11-166479 A | | 6/1999 |
| JP | 2010-281290 A | | 12/2010 |
| KR | 20020045393 | * | 6/2002 |
| KR | 10-0702990 B1 | | 3/2007 |

OTHER PUBLICATIONS

Chinese Office Action issued in counterpart Chinese Application No. 201380072010.X dated Jun. 14, 2016 with partial English translation (10 pages).
International Search Report (PCT/ISA/210) dated Oct. 8, 2013, with English translation (four (4) pages).
Korean-language Office Action issued in counterpart Korean Application No. 10-2015-7020361 dated Jan. 6, 2017 with partial English translation (6 pages).
Chinese Office Action issued in counterpart Chinese Application No. 201380072010.X dated Feb. 7, 2017 with partial English-language translation (twelve (12) pages).

* cited by examiner

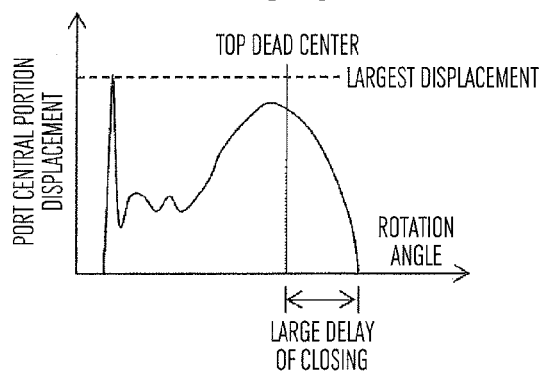
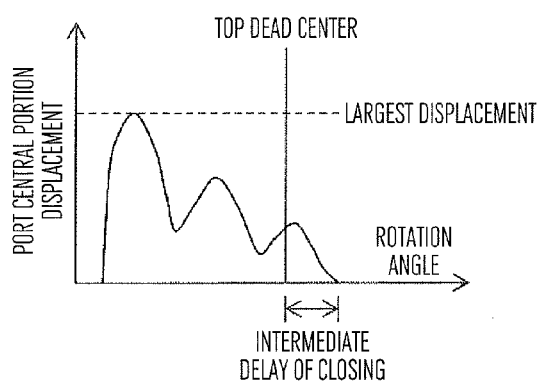
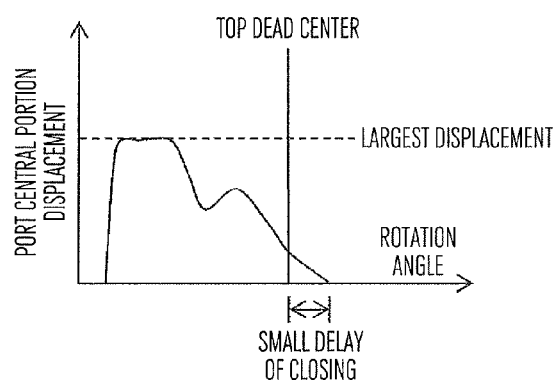

FLUID MACHINE

TECHNICAL FIELD

The present invention relates to a fluid machine.

BACKGROUND ART

PTLs 1 and 2 are background arts in this technical field. PTL 1 discloses a compressor in which a valve pressing portion is provided in a front muffler. PTL 2 discloses a muffler device of a rotary compressor in which a curved retainer which is curved upward is provided in the vicinity of a discharge valve.

CITATION LIST

Patent Literatures

PTL 1: JP-A-2010-281290
PTL 2: JP-A-61-79896

SUMMARY OF INVENTION

Technical Problems

The valve pressing portion (valve retainer) of PTL 1 is inclined so that an open end side recedes from a discharge valve in a part above a discharge port. Therefore, the discharge valve and the valve retainer are not brought into surface contact with each other when the discharge valve is opened, and thus vibration of the discharge valve cannot be satisfactorily reduced.

The curved retainer (valve retainer) of PTL 2 is horizontally provided in a part above a discharge port, and therefore the discharge valve and the valve retainer are not brought into surface contact with each other when the discharge valve is opened. Thus, vibration of the discharge valve cannot be satisfactorily reduced.

In view of the above problems, an object of the invention is to provide a fluid machine capable of reducing vibration of a discharge valve while reducing a delay of closing of the discharge valve.

Solution to Problems

In order to solve the problems, the invention provides "a fluid machine, including: a piston reciprocating in a cylinder; a valve seat plate provided in the cylinder; a valve provided to a port portion of the valve seat plate and opening and closing in accordance with reciprocation of the piston; and a valve retainer for regulating an opening amount of the valve, wherein a surface of the valve retainer, the surface facing the valve seat plate, is inclined above the port portion so that an open end side is closer to the port portion and has a part farthest from the valve seat plate between the port portion and the fixed end".

Advantageous Effects of Invention

According to the invention, it is possible to provide a fluid machine capable of reducing vibration of a discharge valve while reducing a delay of closing of the discharge valve.

BRIEF DESCRIPTION OF DRAWINGS

FIG. 6 is a graph showing displacement of the comparative structure 1 of the valve retainer with respect to a phase of a piston in Example 1 of the invention.

FIG. 7 is a graph showing displacement of the comparative structure 2 of the valve retainer with respect to a phase of a piston in Example 1 of the invention.

FIG. 8 is a graph showing displacement of the valve retainer with respect to a phase of a piston in Example 1 of the invention.

DESCRIPTION OF EMBODIMENTS

Example 1

Example 1 of the invention will be described with reference to FIGS. 1 and 2.

Figure 1:
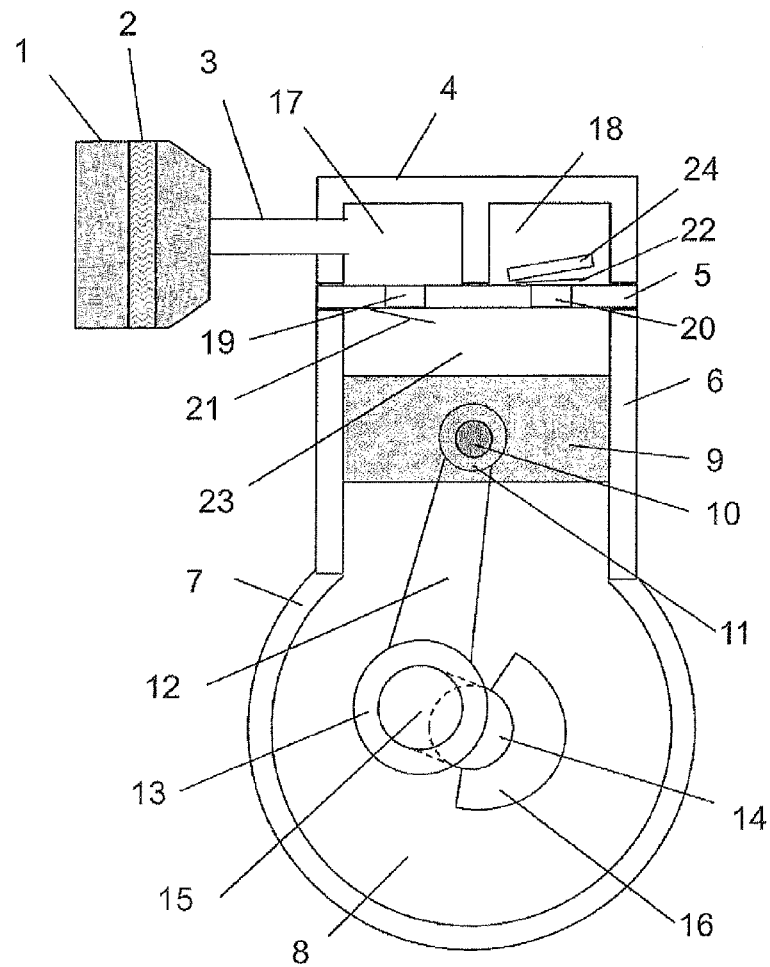
FIG. 1 illustrates a reciprocating compressor in Example 1 of the invention.

FIG. 1 illustrates a whole structure of a reciprocating compressor for compressing fluid, which is an example of a fluid machine in this example. The reciprocating compressor sucks and compresses gas (fluid) such as air and discharges the gas by reciprocating a piston 9 in a cylinder 6. As illustrated in FIG. 1, the reciprocating compressor includes a crankcase 7 which receives the piston 9, and inside of the crankcase 7 serves as a crank chamber 8. A crankshaft 14 is rotatably supported by the crankcase 7.

The crankshaft 14 includes an eccentric shaft 15 which is eccentrically provided, and a balance weight 16 is provided at a position opposite to a position of the eccentric shaft 15. The crankshaft 14 is rotatably driven by connecting a driving source to a connecting shaft portion projected to outside of the crankcase 7.

The tubular cylinder 6 is attached to an upper part of the crankcase 7 in a direction in which an inner circumferential surface thereof is orthogonal to the crankshaft 14 so that an axis line thereof is located in a direction orthogonal to the crankshaft 14. The substantially entire inner circumferential surface of the cylinder 6 has a predetermined diameter in an axial direction, and the cylinder 6 is opened toward the crank chamber 8. A valve seat plate 5 and a cylinder head 4 including a cylinder head main body are mounted on a side opposite to a side of the crankcase 7 across the cylinder 6.

A suction chamber 17 communicating with outside and a discharge chamber 18 are formed in the cylinder head main body, and, on the suction chamber 17 side, a case 1 for preventing sound of a suction valve 21 or the like from being directly transmitted to outside and a filter 2 which is for preventing suction of dust and is provided in the case 1 communicate with the suction chamber 17 via a pipe 3. In the valve seat plate 5 on the suction chamber 17 side, a suction hole 19 (port portion) for causing the suction chamber 17 to communicate with a compression chamber 23 in the cylinder 6 is provided, and in the valve seat plate 5 on the discharge chamber 18 side, a discharge hole 20 (port portion) for causing the discharge chamber 18 to communicate with the compression chamber 23 is provided. The suction valve 21 and a discharge valve 22 serving as reed valves are attached to the valve seat plate 5. The suction valve 21 and the discharge valve 22 open and close the suction hole 19 and the discharge hole 20 in accordance with reciprocation of the piston 9 by causing each base end side (one end) thereof to serve as a fixed end 25 fixed to the valve seat plate 5 via a screw or the like and causing each tip side (the other end) thereof to serve as a free end (open end 26). Note that a valve retainer 24 having satisfactorily higher rigidity than that of the discharge valve 22 is fixed together with the discharge valve 22 to the fixed end, and an opening amount of the discharge valve 22 is reduced by the valve retainer 24.

A connecting rod 12 is rotatably connected to the eccentric shaft 15 of the crankshaft 14 via a bearing. The connecting rod 12 is an integrally molded article having a substantially circular large end portion 13 which is rotatably connected to the crankshaft 14 via a bearing and is provided in one end thereof, a rod portion extending into the cylinder 6 from the large end portion 13, and a substantially circular small end portion 11 which has a diameter smaller than that of the large end portion 13 and is provided in the other end thereof. A central axis line of the circular large end portion 13 and a central axis line of the circular small end portion 11 are parallel to each other, and those central axis lines are orthogonal to a central axis line of the rod portion.

A tubular piston pin 10 is coaxially and rotatably inserted into the small end portion 11 of the connecting rod 12, and the piston 9 is movably connected thereto via the piston pin 10. That is, two pinholes passing therethrough in a radial direction are provided in the piston 9, and the piston 9 is connected to the connecting rod 12 by inserting the small end portion 11 of the connecting rod 12 into one pinhole and inserting the piston pin into the other pinhole. The piston 9 is inserted into and fitted to the cylinder 6 so as to be slidably reciprocated in an axis line direction thereof. In other words, one end side of the connecting rod 12 is connected to the piston 9 and the other end side thereof is connected to the crankshaft 14 in order to reciprocate the piston 9 in the cylinder 6. The piston 9 forms the above-mentioned compression chamber 23 between the cylinder 6 and the valve seat plate 5.

Because the large end portion 13 is eccentrically moved by the eccentric shaft 15 of the crankshaft 14, the piston 9 is reciprocated while being slid in the cylinder 6. In that case, the small end portion 11 connected to the piston 9 linearly moves along a central axis line of the cylinder 6, whereas the large end portion 13 eccentrically moves. Therefore, as a whole, the connecting rod 12 swings in a direction which is orthogonal to a central axis line of the crankshaft 14 and is orthogonal to the central axis line of the cylinder 6. The direction (horizontal direction of FIG. 1) which is orthogonal to the central axis line of the crankshaft 14 and is orthogonal to the central axis line of the cylinder 6 is defined as a swinging direction. Meanwhile, the connecting rod 12 does not swing in an axis line direction of the crankshaft 14. The axis line direction of the crankshaft 14 is defined as a non-swinging direction.

Herein, swinging of the connecting rod 12 will be described. As illustrated in FIG. 1, in the case where the connecting rod 12 is seen in the axis line direction of the crankshaft 14 orthogonal to the swinging direction, the whole connecting rod 12 is positioned at the center in the swinging direction at a bottom dead center. In order that the crankshaft 14 performs a compression process in this state, when the connecting rod 12 is raised by rotating the crankshaft 14 in a counterclockwise direction illustrated in FIG. 1, the large end portion 13 is raised toward an intermediate point between a top dead center and the bottom dead center while being moved to one side (right side of FIG. 1) in the swinging direction, and the large end portion 13 is in a position farthest to the one side (right side of FIG. 1) in the swinging direction at the center (for example, position of 3 o'clock) between the top dead center and the bottom dead center.

Subsequently, the large end portion 13 returns to the center in the swinging direction as the large end portion 13 is moved toward the top dead center, and the large end portion 13 is positioned at the center in the swinging direction at the top dead center, and therefore the whole connecting rod 12 is positioned at the center in the swinging direction. Thus, the compression process is terminated.

When the crankshaft 14 is rotated to perform a suction process in a state in which the piston 9 is positioned at the top dead center, the connecting rod 12 is lowered, and the large end portion 13 is lowered toward an intermediate point between the top dead center and the bottom dead center while being moved in an opposite side (left side of FIG. 1) in the swinging direction and is in a position farthest to the opposite side (left side of FIG. 1) in the swinging direction at the center (for example, position of 9 o'clock) between the top dead center and the bottom dead center.

Subsequently, the large end portion 13 returns to the center in the swinging direction as the large end portion 13 is moved toward the bottom dead center, and the large end portion 13 is positioned at the center in the swinging direction at the bottom dead center, and therefore the whole connecting rod 12 is positioned at the center in the swinging direction (horizontal direction). Thus, the suction process is terminated.

Note that, herein, an example where the small end portion 11 linearly moves and does not perform swinging motion has been described, but the invention is not limited thereto, and the small end portion 11 may perform swinging motion.

Operation of the suction valve 21 and the discharge valve 22 of the reciprocating compressor in this example will be described. In the suction process, the piston 9 is lowered from the top dead center toward the bottom dead center, and the suction valve 21 is opened and the discharge valve 22 is closed. Therefore, air sucked from outside flows into the compression chamber 23 via the suction chamber 17. Subsequently, in the compression process, the piston 9 is raised from the bottom dead center toward the top dead center, and the suction valve 21 is closed and the discharge valve 22 is opened. Therefore, the air in the compression chamber 23 is compressed and flows into the discharge chamber 18.

Figure 3:
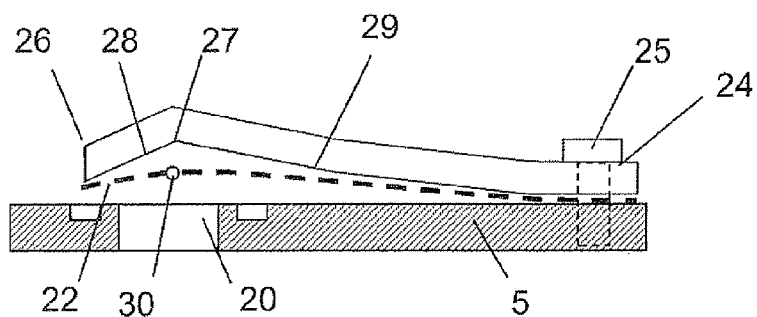
FIG. 3 illustrates a comparative structure 2 of a valve retainer in Example 1 of the invention.
Figure 4:
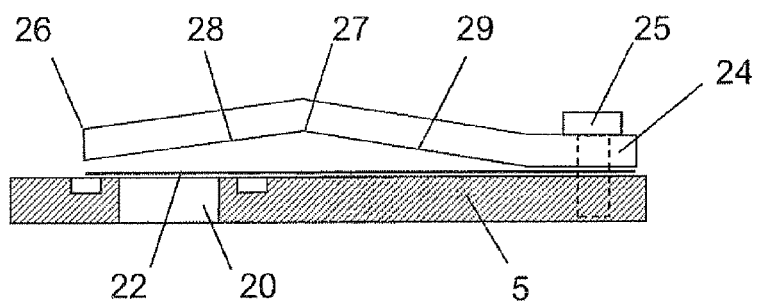
FIG. 4 illustrates a valve retainer in Example 1 of the invention.

A shape of the valve retainer 24 in this example will be described while being compared with those of comparative structures. The shapes of the valve retainers 24 of comparative structures 1 and 2 are illustrated in FIGS. 2 and 3, and the shape of the valve retainer in this example is illustrated in FIG. 4. Relationships, each of which is between displacement of a measurement point 30 of the valve retainer 24 of the comparative structure 1 or 2 or this example and a phase of the piston 9, are shown in FIGS. 6, 7, and 8, respectively.

Herein, the phase of the piston 9 means a phase corresponding to a rotation angle of the crankshaft 14, and the bottom dead center is set to 0 and the top dead center is set to in.

Figure 2:
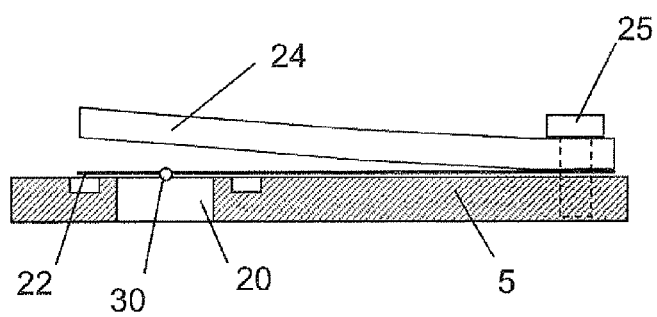
FIG. 2 illustrates a comparative structure 1 of a valve retainer in Example 1 of the invention.

FIG. 2 illustrates the shape of the valve retainer 24 of the comparative structure 1. In the comparative structure 1, the valve retainer 24 is inclined toward the open end 26 from the fixed end 25 to recede from the valve seat plate 5. The operation of the discharge valve 22 in the case of the shape of the valve retainer 24 of the comparative structure 1 will be described. First, in the compression process, the discharge valve 22 is opened due to a pressure difference between the discharge chamber 18 and the compression chamber 23 when opening of the discharge valve 22 starts, but compressed air flows through the discharge hole 20 at the same time as opening of the valve, and a dynamic pressure is generated by this flowing air, and therefore a force to close the discharge valve 22 is also generated. With this, the force applied to the discharge valve 22 is changed as the piston 9 approaches the top dead center, and the force caused by a differential pressure is increased as the piston 9 approaches the top dead center and an air amount flowing from the compression chamber 23 is decreased. Herein, as illustrated in FIG. 6, displacement of a position (measurement point 30) of the discharge valve 22 corresponding to the center of the discharge hole 20 is the largest immediately before the piston 9 approaches the top dead center. In accordance with this, a distance between the valve seat plate 5 and the discharge valve 22 is increased immediately before the piston 9 approaches the top dead center, and therefore it takes time to close the discharge valve 22 and closing of the discharge valve 22 is delayed. This reduces a property of the compressor.

FIG. 3 illustrates the shape of the valve retainer of the comparative structure 2. In the comparative structure 2, a bending portion 27 is provided and the valve retainer 24 is inclined so that the open end 26 side of the valve retainer 24 is closer to the valve seat plate 5 side. With this, displacement of the open end 26 of the valve retainer 24 can be reduced to be smaller than that of the comparative structure 1, and a delay of closing of the discharge valve 22 can be reduced. Further, the bending portion 27 is provided immediately above the discharge hole 20, and the bending portion 27 is in a position where a distance between the valve retainer 24 and the valve seat plate 5 is the largest, and therefore a space immediately above the discharge hole 20 is increased. With this, increase in a discharge resistance, which is caused by decrease in a gap between the open end 26 of the valve retainer 24 and the valve seat plate 5, can be reduced, and the property can be maintained.

However, a position of the discharge hole 20 is a position where the greatest force is applied to the discharge valve 22 and the discharge valve 22 is susceptible to a fluid force caused by spouting of air. Therefore, as illustrated in FIG. 7, vibration is generated while the open end 26 of the valve retainer 24 and the fixed end 25 serve as fulcra. Because the discharge valve 22 vibrates, a contact portion between the discharge valve 22 and the open end 26 of the valve retainer 24 is worn and motion of the discharge valve 22 becomes unstable. This causes a problem such as reduction in property/reliability.

Herein, a configuration of the valve retainer 24 in this example will be described with reference to FIG. 4. The valve retainer 24 is fixed together with the discharge valve 22 to the valve seat plate 5 in the fixed end 25 which is provided on a fixed end side of the discharge valve 22. In this example, the bending portion 27 is provided between the discharge hole 20 and the fixed end 25, and the discharge valve 22 and the valve retainer 24 are farthest from each other in the bending portion 27. An open-end-side inclined surface 28 is configured in such a way that the open end 26 side of the valve retainer 24 of the discharge valve 22 is inclined at, in particular, a position above the discharge hole 20 (position opposite to discharge hole 20) so that the open end 26 side is closer to the valve seat plate 5 (discharge hole 20) from the bending portion 27. Further, the open-end-side inclined surface 28 is configured by a plane.

Figure 5:
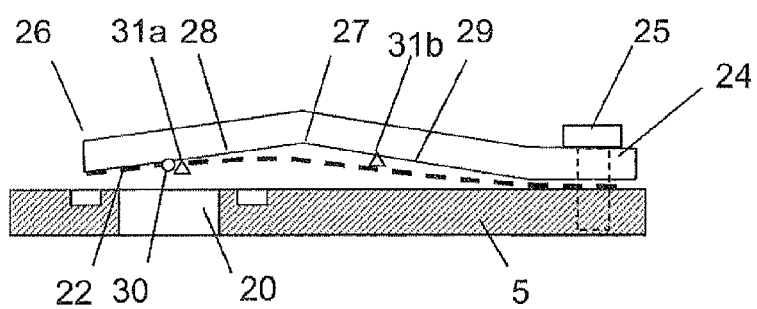
FIG. 5 illustrates deformation of a discharge valve in Example 1 of the invention.

By providing the bending portion 27 between the discharge hole 20 and the fixed end 25, the space immediately above the discharge hole 20 can be reduced. This can prevent a displacement amount of the discharge valve 22 on the open end 26 side from being excessively increased. By reducing the displacement amount of the discharge valve 22 on the open end 26 side, it is possible to prevent the delay of closing thereof and prevent reduction in the property. Further, deformation of the discharge valve 22 has a shape illustrated in FIG. 5, and the displacement of the discharge valve 22 is illustrated in FIG. 8. The discharge valve 22 is brought into contact with an open-end-side contact surface 31a which is configured by a plane and is provided in the open-end-side inclined surface 28 and is also brought into contact with a fixed-end-side contact surface 31b which is provided in a fixed-end-side inclined surface 29 between the bending portion 27 and the fixed end 25. With this, the discharge valve 22 can be brought into surface contact with two parts of the valve retainer 24, and therefore it is possible to reduce vibration of the discharge valve 22.

Figure 9:
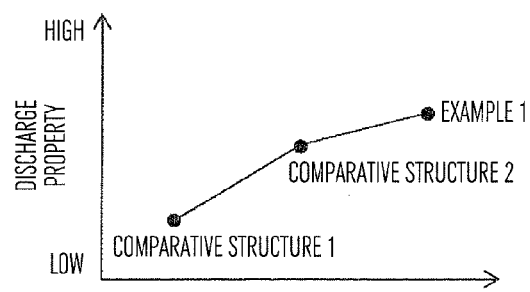
FIG. 9 is a graph in which a property of the valve retainer in Example 1 of the invention and properties of the valve retainers of the comparative structures 1 and 2 are compared.

FIG. 9 illustrates the properties of the compressors of the comparative structures 1 and 2 and this example. Herein, the property of the compressor means a discharge rate (L/min) of the compressor per unit time. As illustrated in FIG. 9, a configuration in this example in which the bending portion 27 is provided between the discharge hole 20 and the fixed end 25 and the open-end-side inclined surface 28 has a straight line has a higher discharge property than those of the comparative structures 1 and 2.

From the above, according to this example, the bending portion 27 is provided between the discharge hole 20 of the discharge valve 22 and the fixed end 25, and the open end 26 side is inclined to be closer to the valve seat plate 5 (discharge hole 20) in a part above the discharge hole 20. Therefore, it is possible to reduce vibration of the discharge valve while reducing the delay of closing of the discharge valve and is also possible to reduce noise.

Example 2

Example 2 of the invention will be described with reference to FIG. 10. The same configurations as those in Example 1 are denoted by the same reference signs, and description thereof will be omitted.

Figure 10:
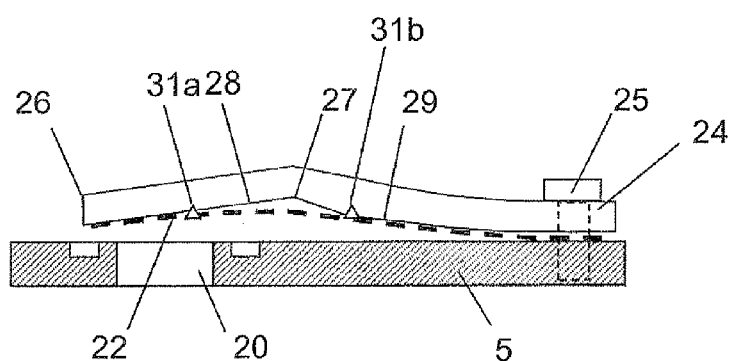
FIG. 10 illustrates a valve retainer in Example 2 of the invention.

In this example, as illustrated in FIG. 10, a protrusion portion is provided in the fixed-end-side inclined surface 29 from the bending portion 27 to the valve seat plate 5. That is, a surface from the bending portion 27 to the fixed end 25, the surface facing the valve seat plate 5, is configured by connecting at least two surfaces having different inclinations. The inclination on a side closer to the bending portion 27 is set to be larger than the inclination on the fixed end 25 side.

With this, when the discharge valve 22 is opened, the discharge valve 22 is brought into contact with two parts, i.e., the open-end-side contact surface 31a in the open-end-side inclination surface 28 of the valve retainer 24 and the fixed-end-side contact surface 31b in the fixed-end-side inclined surface 29 thereof, which is similar to Example 1. However, a distance between the open-end-side contact surface 31*a* and the fixed-end-side contact surface 31*b* can be reduced more than that in Example 1. Thus, according to this example, because an elastically deformed part is reduced, it is possible to further reduce vibration of the discharge valve 24 and improve property/reliability, as compared to Example 1.

Example 3

Example 3 of the invention will be described with reference to FIGS. 11 and 12. The same configurations as those in Examples 1 and 2 are denoted by the same reference signs, and description thereof will be omitted.

Figure 11:
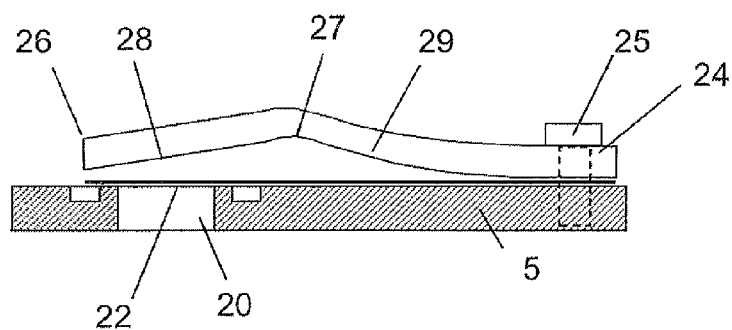
FIG. 11 illustrates a valve retainer in Example 3 of the invention.
Figure 12:
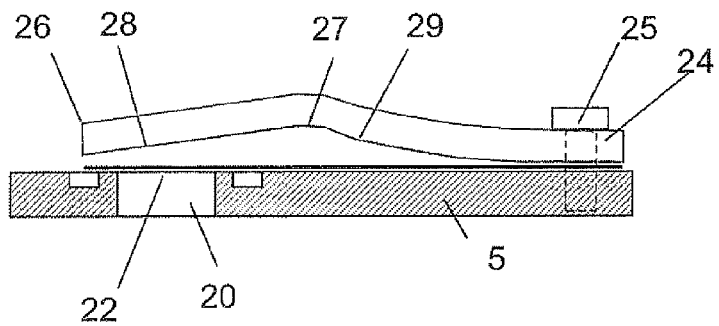
FIG. 12 illustrates a valve retainer in a modification example of Example 3 of the invention.

In this example, as illustrated in FIG. 11, a surface between the bending portion 27 and the fixed end 25, the surface facing the valve seat plate 5, is configured as a curved surface protruding toward the valve seat plate 5 side. Further, as illustrated in a modification example of FIG. 12, the surface between the bending portion 27 and the fixed end 25, the surface facing the valve seat plate 5, may be configured to have a shape obtained by connecting a plane surface and a curved surface.

According to this example, because the discharge valve 22 is brought into contact with the curved surface, it is possible to reduce stress concentration while the discharge valve 22 is in contact with the curved surface. It is possible to further reduce vibration of the discharge valve 24 and improve property/reliability, as compared to Example 2.

Example 4

Example 4 of the invention will be described with reference to FIG. 13. The same configurations as those in Examples 1 to 3 are denoted by the same reference signs, and description thereof will be omitted.

Figure 13:
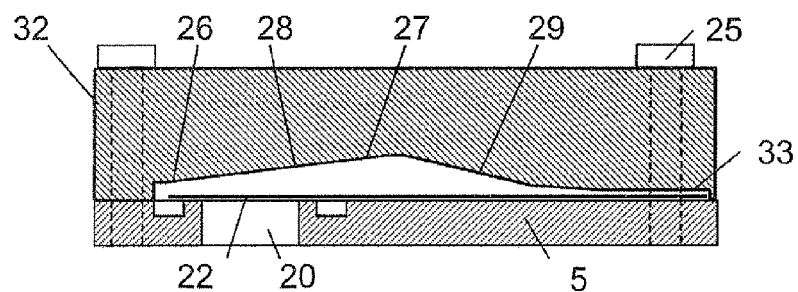
FIG. 13 illustrates a valve retainer in Example 4 of the invention.

As illustrated in FIG. 13, this example includes a valve fixing portion 32 in which the valve retainer is integrally provided with the cylinder head 4. The open-end-side inclined surface 28, the bending portion 27, and the fixed-end-side inclined surface 29 of the valve retainer 24 are provided in the valve fixing portion 32 and the discharge valve 22 is inserted between the valve fixing portion 32 and the valve seat plate 5 in the same way as Examples 1 to 3.

According to this example, the number of components can be reduced more than that in Example 1, and therefore it is possible to improve assemblability and reduce costs.

Example 5

Example 5 of the invention will be described with reference to FIG. 14. The same configurations as those in Examples 1 to 4 are denoted by the same reference signs, and description thereof will be omitted.

Figure 14:
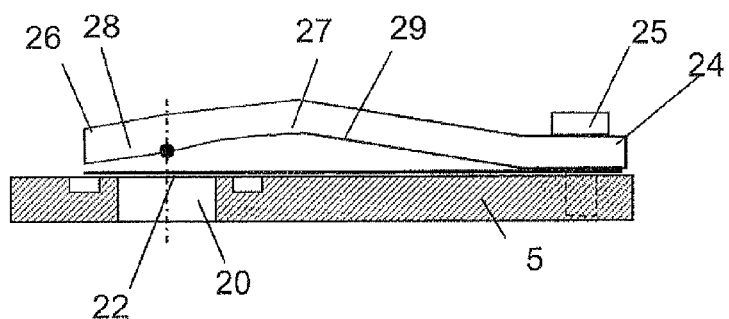
FIG. 14 illustrates a valve retainer in Example 5 of the invention.

In this example, as illustrated in FIG. 14, a surface between the bending portion 27 and the open end 26 side, the surface facing the valve seat plate 5, has a shape obtained by connecting a plane surface and a curved surface recessed toward the valve seat plate 5. The plane surface is extended into a position above the discharge hole 20, and therefore it is possible to provide a contact portion where the discharge valve 22 and the open-end-side inclined surface 28 are in surface contact with each other.

According to this example, by providing the curved surface recessed toward the valve seat plate 5, it is possible to have a large space between the discharge valve 22 and the valve retainer 24 and therefore a loss of discharge can be reduced more than that in Example 1. By combining this example with Example 3, vibration of the valve can be also reduced, and therefore it is possible to improve property/reliability.

The above examples have been described in detail to easily understand the invention, and therefore the invention is not necessarily limited to examples having all the configurations described above. Further, it is possible to replace a part of a configuration of a certain example with a configuration of another example, and it is also possible to add a configuration of another example to a configuration of a certain example. Furthermore, it is possible to add/remove/replace another configuration to/from/with a part of a configuration of each example.

REFERENCE SIGNS LIST

1: case
2: filter
3: pipe
4: cylinder head
5: valve seat plate
6: cylinder
7: crankcase
8: crank chamber
9: piston
10: piston pin
11: small end portion
12: connecting rod
13: large end portion
14: crankshaft
15: eccentric shaft
16: balance weight
17: suction chamber
18: discharge chamber
19: suction hole (port portion)
20: discharge hole (port portion)
21: suction valve
22: discharge valve
23: compression chamber
24: valve retainer
25: fixed end
26: open end
27: bending portion
28: open-end-side inclined surface
29: fixed-end-side inclined surface
30: measurement point of displacement of discharge valve
31*a*: open-end-side contact surface
31*b*: fixed-end-side contact surface
32: valve fixing portion

The invention claimed is:

1. A fluid machine, comprising:
   a piston reciprocating in a cylinder;
   a valve seat plate provided in the cylinder;
   a valve for opening and closing a port portion of the valve seat plate in accordance with reciprocation of the piston, one end of the valve being fixed to the valve seat plate; and
   a valve retainer for reducing an opening amount of the valve, one end of the valve retainer being fixed with a fastener together with the valve to the valve seat plate, wherein
       the fastener spans through the one end of the valve retainer and the valve to thereby fasten the one end of the valve retainer and the valve to the valve seat plate, and a second end of the valve retainer that is opposite to the one end does not contact the valve seat plate,
wherein a surface of the valve retainer that faces the port portion, is inclined relative to the valve seat plate so that the surface is closer to the port portion at the second end than at a part farthest from the valve seat plate which is between the port portion and the fixed end.

2. The fluid machine according to claim 1, wherein a contact surface of the valve retainer to be brought into contact with the valve is provided between the part of the valve retainer farthest from the valve seat plate, and the fixed end.

3. The fluid machine according to claim 1, wherein the surface facing the valve seat plate between the part of the valve retainer, the part being farthest from the valve seat plate, and the fixed end has a shape obtained by connecting at least two plane surfaces having different inclinations.

4. The fluid machine according to claim 3, wherein an inclination on a side opposite to the fixed end side is set to be larger than the inclination on the fixed end side.

5. The fluid machine according to claim 1, wherein the surface facing the valve seat plate between the part of the valve retainer farthest from the valve seat plate, and the fixed end is provided as a curved surface protruding toward the valve seat plate.

6. The fluid machine according to claim 5, wherein a curvature of the curved surface varies.

7. The fluid machine according to claim 1, wherein the surface facing the valve seat plate between the part of the valve retainer farthest from the valve seat plate, and the fixed end has a shape obtained by connecting a plane surface and a curved surface.

8. The fluid machine according to claim 1, wherein the valve retainer is a valve fixing portion integrally provided with the cylinder head.

9. The fluid machine according to claim 1, wherein the surface facing the valve seat plate between the part of the valve retainer farthest from the valve seat plate, and the second end has a shape obtained by connecting a plane surface and a curved surface.

10. The fluid machine according to claim 1, wherein the valve and the valve retainer are longitudinally coextensive.

11. A fluid machine, comprising:
a piston reciprocating in a cylinder;
a valve seat plate provided in the cylinder;
a valve for opening and closing above a port portion of the valve seat plate in accordance with reciprocation of the piston, one end of the valve being fixed to the valve seat plate; and
a valve retainer for reducing an opening amount of the valve, one end of the valve retainer being fixed with a fastener together with the valve to the valve seat plate,
wherein the valve retainer has a bending portion between the port portion and the fixed end and, is inclined toward an open end side, the open end side being separated from the valve and the valve seat plate by a distance that is larger than a thickness of the valve,
wherein the bending portion is a part farthest from the valve seat plate which is between the port portion and the fixed end, and
wherein a surface of the valve retainer that faces the valve seat plate is inclined relative to the valve seat plate so that the surface is closer to the port portion at the second end than at the bending portion.

12. The fluid machine according to claim 11, wherein a contact surface to be brought into contact with the valve is provided between the bending portion of the valve retainer and the fixed end.

13. The fluid machine according to claim 11, wherein the surface facing the valve seat plate between the bending portion of the valve retainer and the fixed end has a shape obtained by connecting at least two plane surfaces having different inclinations.

14. The fluid machine according to claim 13, wherein the inclination on a side close to the bending portion is set to be larger than the inclination on the fixed end side.

15. The fluid machine according to claim 11, wherein the surface facing the valve seat plate between the bending portion of the valve retainer and the fixed end is provided as a curved surface protruding toward the valve seat plate.

16. The fluid machine according to claim 15, wherein a curvature of the curved surface varies.

17. The fluid machine according to claim 11, wherein the surface facing the valve seat plate between the bending portion and the fixed end has a shape obtained by connecting a plane surface and a curved surface.

18. The fluid machine according to claim 11, wherein the valve retainer is a valve fixing portion integrally provided with the cylinder head.

19. The fluid machine according to claim 11, wherein the surface facing the valve seat plate between the bending portion of the valve retainer and the open end has a shape obtained by connecting a plane surface and a curved surface.

* * * * *